(12) United States Patent
Kuchibhotla et al.

(10) Patent No.: US 8,194,257 B2
(45) Date of Patent: Jun. 5, 2012

(54) SIMPLIFIED OPERATION OF SCAN BASED DEVICES

(75) Inventors: Anjaneyulu Seetha Rama Kuchibhotla, Bangalore (IN); Dinesh Mandalapu, Bangalore (IN); Tracy Freeman, Boise, ID (US); Kimberly A Salisbury, Boise, ID (US)

(73) Assignee: Hewlett-Packard Development Company, LP., Houston, TX (US)

( * ) Notice: Subject to any disclaimer, the term of this patent is extended or adjusted under 35 U.S.C. 154(b) by 950 days.

(21) Appl. No.: 12/200,937

(22) Filed: Aug. 29, 2008

(65) Prior Publication Data

US 2009/0128865 A1    May 21, 2009

Related U.S. Application Data

(60) Provisional application No. 60/988,106, filed on Nov. 15, 2007.

(51) Int. Cl.
*G06F 15/00* (2006.01)

(52) U.S. Cl. ........................ 358/1.13; 455/403

(58) Field of Classification Search .............. 358/1.15, 358/1.13, 1.14, 2.1, 448, 474, 408, 509, 403, 358/402, 518; 235/461.15, 492, 382, 454, 449; 382/165, 167, 235, 287, 119, 175; 715/255, 222; 455/403, 425

See application file for complete search history.

(56) References Cited

U.S. PATENT DOCUMENTS

| | | | |
|---|---|---|---|
| 6,909,805 B2 | 6/2005 | Ma et al. | |
| 6,950,982 B1 | 9/2005 | Dourish | |
| 6,952,803 B1 | 10/2005 | Bloomberg et al. | |
| 2004/0205538 A1 | 10/2004 | Banerjee et al. | |
| 2005/0071738 A1 | 3/2005 | Park et al. | |
| 2005/0114772 A1 | 5/2005 | Talley et al. | |
| 2005/0195447 A1* | 9/2005 | Os ................................ | 358/407 |
| 2005/0231746 A1* | 10/2005 | Parry et al. ................... | 358/1.13 |
| 2006/0218496 A1 | 9/2006 | Kunori | |
| 2006/0224950 A1 | 10/2006 | Takaai et al. | |
| 2007/0147680 A1 | 6/2007 | Lundberg | |
| 2007/0188793 A1 | 8/2007 | Wakai | |

* cited by examiner

*Primary Examiner* — Saeid Ebrahimi Dehkordy

(57) ABSTRACT

A document scanner comprises a scan bed, and a processor means which is adapted to: analyse a scanned image to detect one or more defined markings on the scanned document in addition to and adjacent the document content desired to be scanned by the user; and in response to detection of one or more defined markings, to control the document scanner in response to the defined markings.

20 Claims, 5 Drawing Sheets

SIMPLIFIED OPERATION OF SCAN BASED DEVICES

CROSS-REFERENCE TO RELATED APPLICATIONS

This Utility Patent Application is based on and claims the benefit of U.S. Provisional Application No. 60/988,106, filed on Nov. 15, 2007, the contents of which are hereby incorporated by reference in their entirety.

BACKGROUND OF THE INVENTION

This invention relates to simplified operation of scan based devices, including single function devices (that just have scanning capability) and multi-function devices.

Multifunction scan-based devices are becoming increasingly popular, both for the home and the office. Such devices are known as "multi function printers" or "All in Ones", and can typically print, scan and copy, and optionally also generate faxes and emails. These devices typically have a user input system based on a hierarchy of menus. These menus need to be provided on a relatively small screen. This sometimes makes the user experience complicated, as a user needs to navigate to find the right setting through the control panel.

With many different options relating to the different basic functions (of scanning, copying, printing, faxing and emailing), finding a particular menu can become a complicated and time consuming task.

The problem has been recognized, and one proposed solution is to have dedicated buttons for some of the most frequently used functionality settings on the control panel. In addition, efforts have been made to make menu structures as intuitive as possible to allow easier navigation. For example, the use of touch and stylus inputs also aims to improve the menu navigation experience.

BRIEF DESCRIPTION OF THE DRAWINGS

Examples of the invention will now be described in detail with reference to the accompanying drawings, in which.

DETAILED DESCRIPTION

Examples of the invention relate to a document scanner comprising a scan bed and a processor means for controlling the device functions.

In some examples, the document scanner has a display screen for displaying menu-based function options relating to the scanning operation and an input device for receiving function selections from a user. The processor controls the display screen to display a menu based on the function selections received from a user. This is the normal input and display function of a document scanner.

Examples of the invention provide the device with the ability to analyse a scanned image to detect one or more defined markings on the scanned document, in addition to and adjacent the document content desired to be scanned by the user. In response to detection of one or more defined markings, the document scanner is controlled in response to the defined markings.

For example, if the device has a menu-based user interface, the display screen can be controlled to shortcut to the display of an associated menu.

This approach provides a combination of the scan capability of the device with the limited interactive capability, in order to enhance the overall user experience in a seamless fashion.

In particular, quite often the user needs to access settings or options of the device which can involve detailed navigation of the hierarchy of menus provided by the device control panel. The approach above allows random access to menu functionality options, thus enhancing the overall user experience.

Instead of providing menu shortcuts, the defined markings can provide all the information required for the device to perform a scan based operation, with no further user input.

Figure 1:
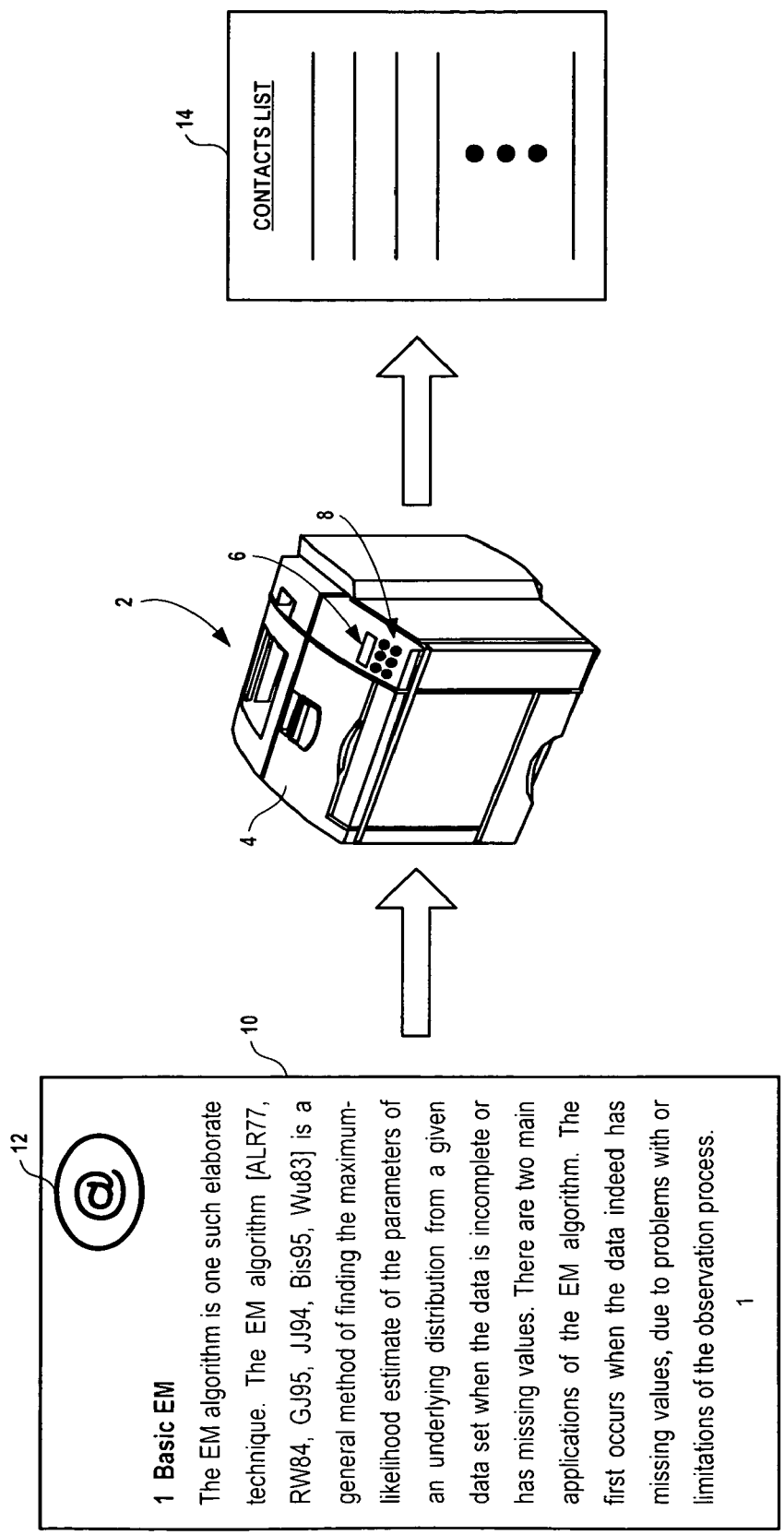
FIG. 1 shows a first example of use of a system forming an example of the invention.

FIG. 1 shows a first example of how the device operates. The device 2 in this example is a multifunction scanner, and has a scan bed under the lid 4, a display screen 6 for displaying menu-based function options relating to the scanning operation, and an input device 8 for receiving function selections from a user. The input device can comprise buttons, as shown, but also a touch sensitive display screen, for operation by finger touch or using a stylus, can be used.

The device has a processor which controls the display screen to display menu options, based on the previous function selections received from the user (using the button, touch or stylus input).

A document to be scanned is shown as 10. The user has drawn a character in the top right of the document. In this example, the character is the "@" symbol, and it is within a continuous circle. The circle and character are both hand drawn by the user. The character is used to indicate that the user would like a menu which relates to the sending of an email.

The character is in addition to and adjacent the document content desired to be scanned by the user. In other words, the additional control characters are inserted on the same page as the document content being scanned by the user, so that no additional pages need to be scanned in order for the additional simplified device control to be implemented. The annotations can be preprinted and stuck on the document by the user.

The markings for shortcuts could either be pre-defined by the system, defined by the system but changed by the user (for instance the user may prefer to use the character E for this shortcut), or the markings can be defined by the user to be personalized by a suitable interface (an electronic interactive interface or paper based interface which is scanned in) to configure the markings initially.

The document scanner detects the presence of the pre-defined symbol, and controls the menu options based on an analysis of the symbols within the scanned document.

In response to detection of the "@" symbol, the display screen is controlled to shortcut to the display of an associated menu. This menu is shown as 14, and provides a contact list for the user to select the email address to which the email is to be sent.

This approach takes advantage of the ability of the device to scan documents, to include the detection of handwritten gestures on the paper document being scanned. These gestures are of a pre-specified notation, and they are used as shortcuts to menu options that the user needs (or wishes) to access in order to complete any of the operations the device provides.

In the example of FIG. 1, the user-input gestures are in the right-hand corner of the page, in a predefined notation of being circled to provide demarcation. Of course other ways of identifying that a marking is for interpretation by the scanner can be used—for example specific colours, shapes, or unusual symbols which will not appear in typical documents. Similarly, the whole document may be analysed so that the user can write the symbol anywhere there is a blank space of sufficient size, or else other specific areas can be used, for example anywhere in the outer border. This outer border, for example the 2.5 cms around the edge of a document, will typically not contain any document text.

The symbols may be linked to the type of scan, for example a scan, copy, email or fax. This basic type of operation may have to be selected by the user when operating the device, and can therefore be considered as the highest level of instruction. This means that the same symbol can have different meanings for different basic types of scan. The advantage of this is that the symbols can be made as intuitive as possible.

Alternatively the higher level operation can also be provided as a marking followed by the shortcut required to be accessed. For example, the higher level operation of email can be denoted by an encircled E. A generic symbol (i.e. without having named functionality associated with it) can also be used as an identifier.

In the example above, there is one layer of high level instruction which needs to be selected before the scan is carried out, and the symbols can be interpreted. Instead, there may be two or more layers of instruction which are received before the scan is carried out (for example scan-colour). This enables the symbols to be used within that type of operation to be more intuitive.

Figure 2:
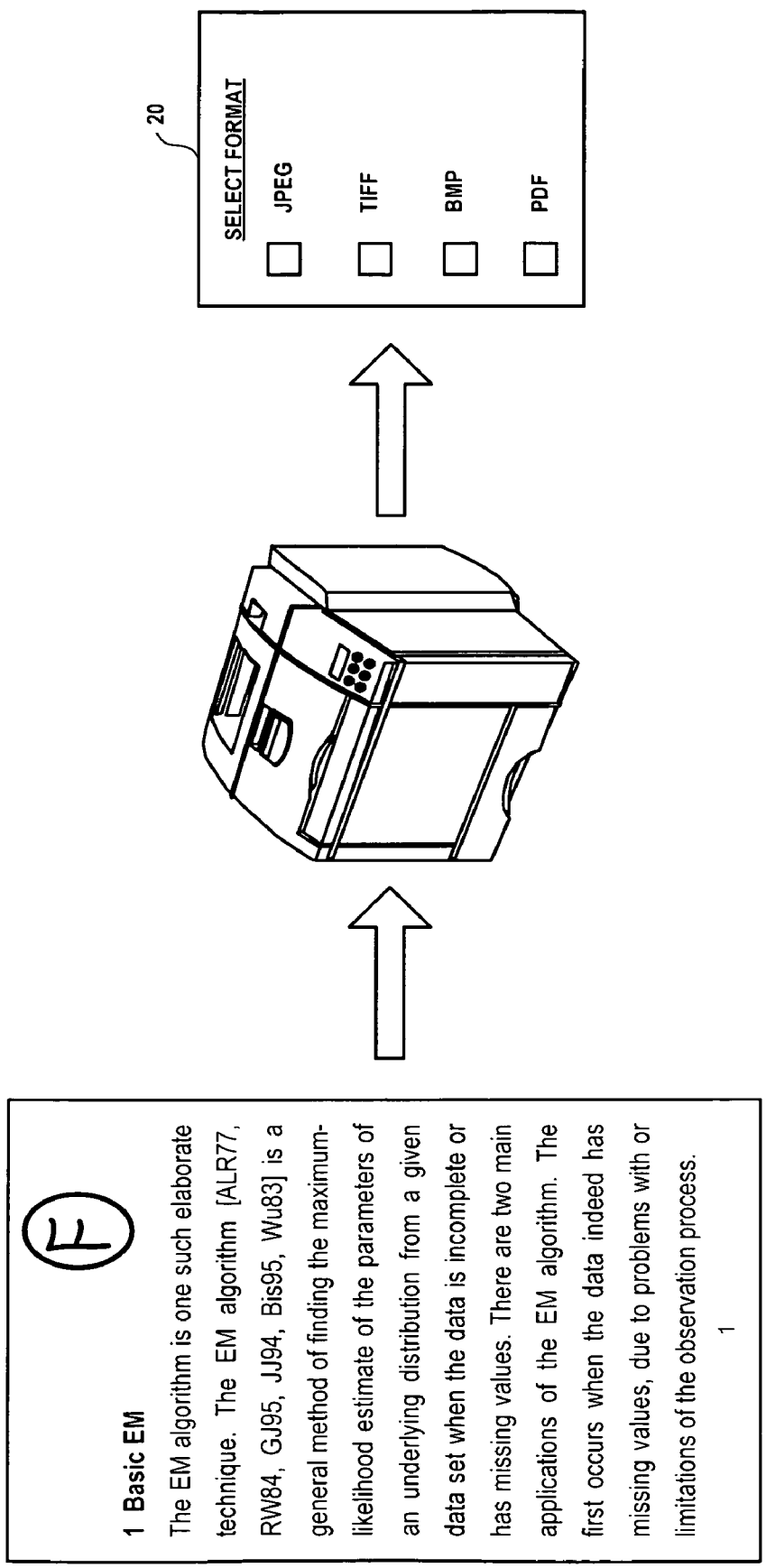
FIG. 2 shows a second example of use of a system forming an example of the invention.

FIG. 2 shows a symbol F used to indicate that a file format menu should be given. This relates to email functionality, and the user may want to email the document in a format which is not the default. The corresponding menu 20 is shown which is displayed on the screen to enable the user to select the file format.

Figure 3:
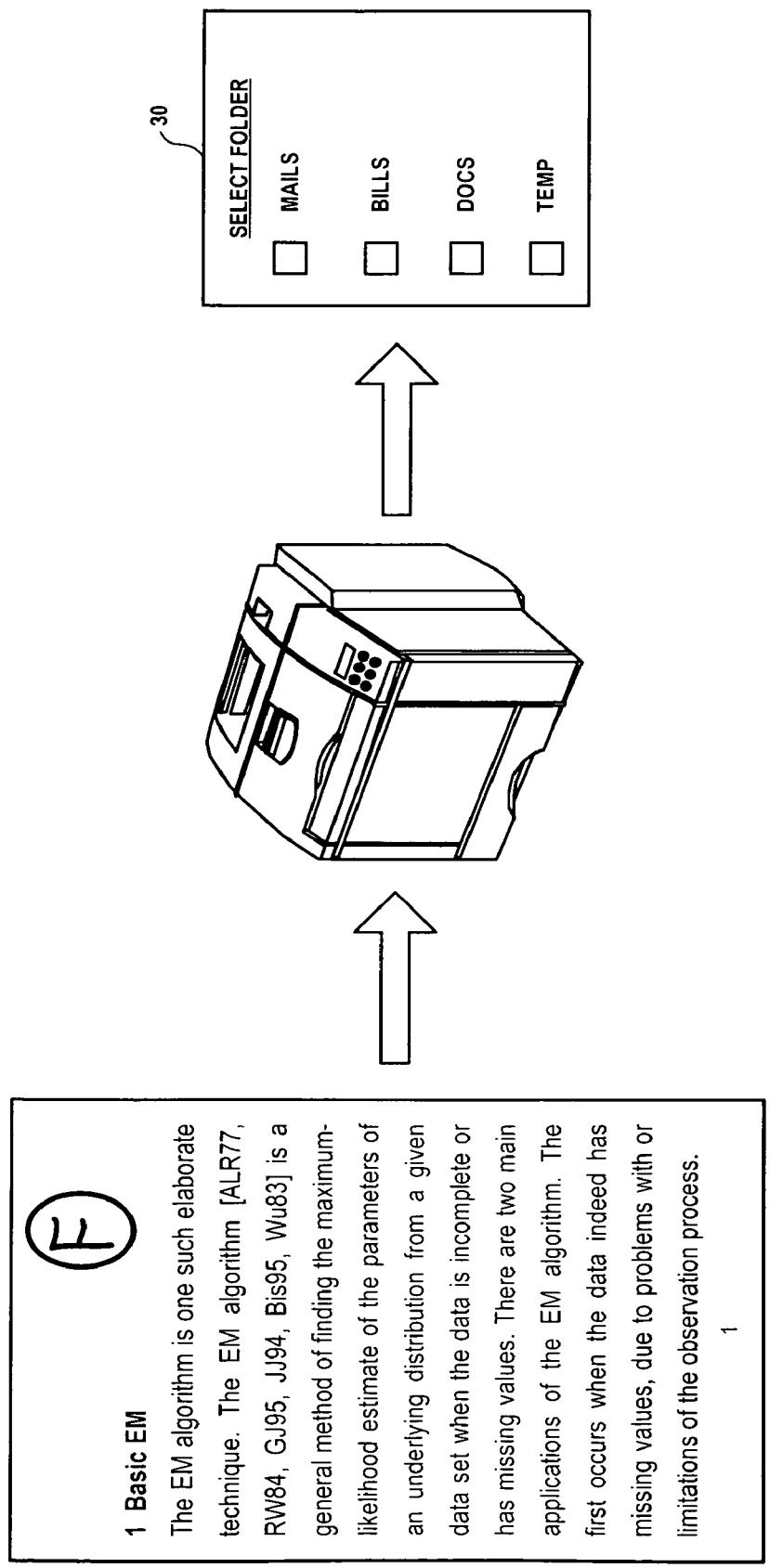
FIG. 3 shows a third example of use of a system forming an example of the invention.

FIG. 3 shows a symbol F used to indicate that a file save folder menu should be given. This relates to a scan functionality (rather than the email functionality of FIG. 2), and enables the user to select the folder in which the scanned document is to be saved. The corresponding menu 30 is shown which is displayed on the screen to enable the user to select the file save folder. Thus, the symbol F can be used both to select the folder and the format for different functionality and is therefore context-sensitive.

Figure 4:
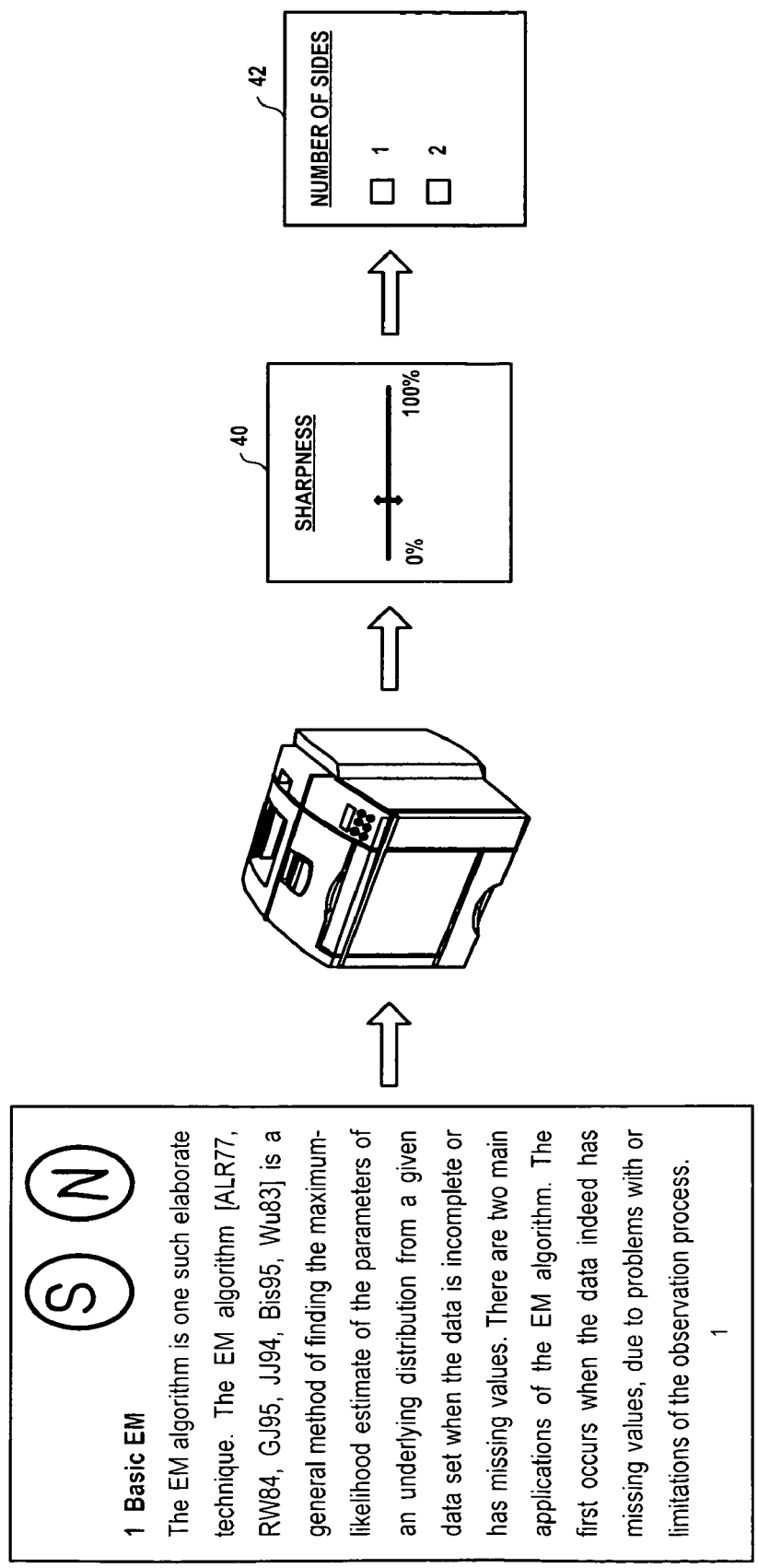
FIG. 4 shows a fourth example of use of a system forming an example of the invention.

FIG. 4 shows the two symbols S and N, and for use with copy functionality. This can be used to allow the user to select the sharpness of a page at the time of copying a document, using the letter S, and the number of sides to be printed using the letter N When the copying takes place, the device provides the control panel menu structure corresponding to sharpness, as shown at 40. Again, the user does not need to navigate to find it. FIG. 4 shows that multiple shortcuts can be provided. The system recognizes and stores each annotation and in sequence provides the menus that the user has provided shortcuts for. In FIG. 4, a second menu option 42 gives the user the option of selecting whether the copying is to single sided or double sided format.

Figure 5:
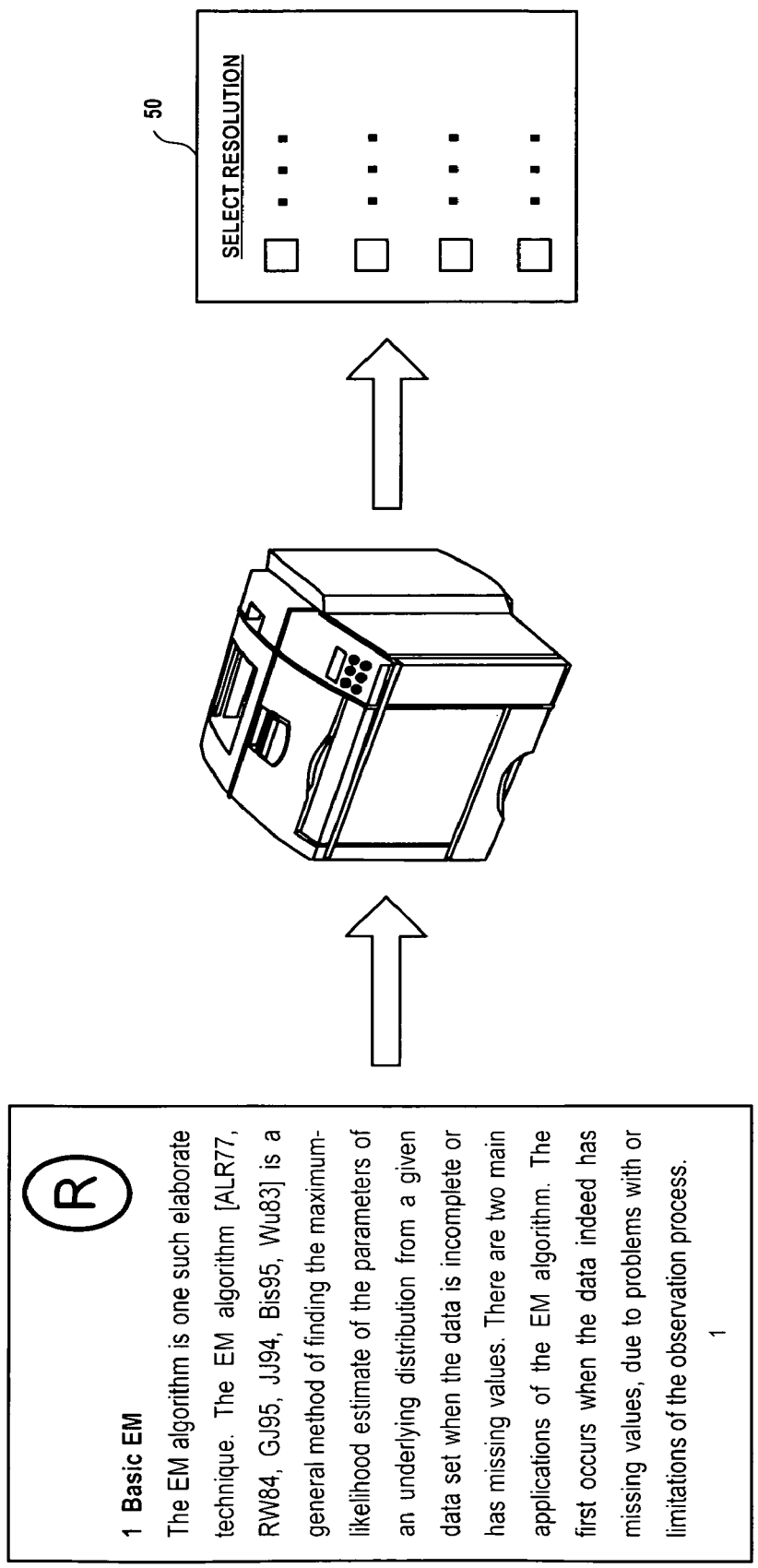
FIG. 5 shows a fifth example of use of a system forming an example of the invention.

FIG. 5 shows a symbol R used to indicate that a resolution selection menu should be given. This relates to fax functionality. The corresponding menu 50 is shown which is displayed on the screen to enable the user to select the resolution for faxing.

In the examples above, the user annotation always controls the device to shortcut to a particular menu. Where the menu has well defined options, the user could in these cases provide a value for the menu option. For example, in the example of requiring a sharpness selection, the user could set the sharpness to 80 percent while copying by using an annotation "S=80" within the circle. This would be interpreted as the user wanting to change the sharpness to 80 percent. A combination of shortcuts to menus and values for menus could be combined together.

The method of processing an image, implemented by the device, involves:

extracting shortcut gestures from paper;

recognizing the gesture;

using the context (i.e. the type of operation being carried out, such as scan, copy, fax, email, etc.) in order to determine the menu corresponding to the gesture;

providing this information to the interactive menu system to indicate the menu the user needs or desires on the control panel, for menus for which values need to be set. If there is more than one shortcut the device repeats this for every shortcut.

The exact set of gestures and demarcations from other material on the page to be used can be determined based on allowing easy segregation of these from the rest of the document. The selection should allow easy training of end users, and the different possible markings should be easily recognized with high accuracy.

The system above enhances the user experience for scan based devices. By providing shortcuts to menus, the number of different symbols can be kept small so the use of the symbols does not add excessive complexity to the operation of the device. Users are typically familiar and comfortable with the menu-based selection system, so this is maintained. However users may have difficulties navigating to a desired menu, and the shortcuts can be used for cases where the menu navigation may not be completely routine. The shortcut system can be used for more obscure menus because these may not be easiest to find, or it may be for more common menus to speed up operation of the system. The shortcut menus may be for a combination of these.

The user marking is placed on a clear area of the document. When the system recognises a marking, it can replace the marking with the detected background in the prepared document, so that the saved, emailed, faxed or copied document does not include the marking.

The image processing required to recognise and analyse the markings is well known. The use of a continuous line around a marking enables easy demarcation but other syntax can also be used for demarcation.

Handwritten character recognition software is also widely available for analyzing text portions. Thus, the implementation of the processing algorithm required will be completely routine to those skilled in the art. The control implemented once a marking has been recognised is simply treated as a part of the input to the graphical user interface, and the implementation of the menu control is thus also routine to those skilled in the art.

The basic flow of the software that carries out this processing is:

a) Identify handwritten annotations on the page b) Filter annotations that have the syntax corresponding to menu shortcuts, in this case encircled handwritten text c) Send the contents of the shortcut to an offline handwriting recognition system for recognition d) Take the result of recognition and if necessary use a dictionary of possible shortcuts along with the context to determine the shortcut. If there is no match, output an appropriate error or ignore the marking e) Look up the shortcut in a table to indicate what menu it refers to and pass on that information to the menu control software f) The menu software displays that menu to the user or sets the menu option if a value is also provided.

g) The user completes the menu interaction. Steps (c) to (g) can be repeated in case of multiple annotations received from (b).

h) The device to process the document after removing markings (the markings can optionally be left by the device if the user specifies this in a menu option)

The system can be implemented as part of the software controlling the GUI of the device.

The examples of menu options given above are only a few examples of the possible menu functions to which there can be shortcuts. In practice, the full range of functions provided by the device can be analysed to select those which are most appropriate for shortcut menus.

Equally, the use of a circle to identify commands is only one example of a possible method. Colour may instead be used, or particular symbols to indicate the start and/or end of a command.

As mentioned above, the command symbols can be set or changed by the user, to make the device operation as intuitive as possible for a particular user. Furthermore, the device functions for which shortcuts are provided can also be set or amended by the user.

The preferred example of handwritten annotations is given above. However, the system may be designed for printed annotation as well, so that desired control operations can be printed as part of the document when it is prepared. In this case, the syntax for identifying commands needs to be easily printable, for example a sequence of symbols (not normally occurring in written text) may be used as an identifier.

In the preferred implementation of the invention described above, the handwritten input provides menu shortcuts. However, the markings can provide the full control of the device, avoiding the need for any further user input. For example, a copy function with scaling may be initiated immediately with a written command C=90% (a copy function with 90% scaling). No further user input is then required, and the device can perform the requested function without needing to shortcut to any menu requiring user input. It will be apparent therefore, that the invention in some aspects can be applied to a device which does not have a display screen for displaying menu based options. The invention can thus be used to simplify the operation of low-end devices, or devices which present their user interface on the screen of a computer used to control them. For example, menu shortcuts may be provided, but to the screen of a controlling computer rather than an integral screen of the document scanner.

While specific embodiments have been described herein for purposes of illustration, various modifications will be apparent to a person skilled in the art and may be made without departing from the scope of the invention.

We claim:

1. A document scanner, comprising:
   a scan bed;
   a display screen for displaying menu-based function options relating to a scanning operation;
   a memory storing machine readable instructions to:
   analyze a scanned image to detect one or more defined markings on the scanned document, wherein the one or more defined markings are associated with menus to be displayed on the display screen; and
   in response to detection of the one or more defined markings, to control the display screen to display the menu associated with the detected one or more of the defined markings; and
   a processor to implement the machine readable instructions.

2. A document scanner as claimed in claim 1, further comprising:
   an input device for receiving function selections displayed on the display screen from a user.

3. A document scanner as claimed in claim 1, wherein the defined markings comprise shortcuts to respective user functions of the document scanner.

4. A document scanner as claimed in claim 3, wherein the user functions are at least one of selectable and amendable by a user.

5. A document scanner as claimed in claim 1, wherein the defined markings comprise shortcut commands to give an indication that at least one of:
   a sharpness control is desired;
   a generation of an email is desired;
   a selection of file save format is desired;
   resolution control is desired;
   a selection of file save location is desired; and
   a control of the number of sides in the generated scanned document is desired.

6. A document scanner as claimed in claim 1, wherein the memory further stores machine readable instructions to allocate the one or more defined markings to at least one associated menu based on a type of scan being conducted.

7. A document scanner as claimed in claim 1, wherein the defined markings comprise a set of symbols.

8. A document scanner as claimed in claim 1, wherein the defined markings comprise a set of symbols coded with a machine readable identifier.

9. A document scanner as claimed in claim 1, wherein the memory further stores machine readable instructions for analyzing a pre-defined region of the scanned document to detect the one or more defined markings.

10. A document scanning method, comprising:
    scanning a document into a document scanner, said document scanner comprising a display screen for displaying menu-based function options relating to a scanning operation;
    analyzing the scanned document to detect one or more defined markings on the scanned document, wherein the one or more defined markings are associated with menus to be displayed on the display screen; and
    in response to detection of the one or more defined markings, controlling the display screen to display the menu associated with the detected one or more of the defined markings.

11. A document scanning method as claimed in claim 10, wherein the one or more defined markings are provided on the document in addition to and adjacent content desired to be scanned, and wherein analyzing the scanned document further comprises distinguishing the one or more defined markings from the content desired to be scanned.

12. A document scanning method as claimed in claim 10, wherein the defined markings comprise shortcuts to respective user functions of the document scanner.

13. A document scanning method as claimed in claim 11, wherein the user functions are at least one of selectable and amendable by a user.

14. A method as claimed in claim 10, wherein the defined markings comprise shortcut commands to give an indication that at least one of:

a sharpness control is desired;
a generation of an email is desired;
a selection of file save format is desired;
resolution control is desired;
a selection of file save location is desired; and
a control of the number of sides in the generated scanned document is desired.

15. A method as claimed in claim 10, further comprising allocating the one or more defined markings to at least one associated menu based on a type of scan being conducted.

16. A method as claimed in claim 10, wherein the defined markings comprise a set of symbols.

17. A method as claimed in claim 10, wherein the defined markings comprise a set of symbols coded with a machine readable identifier.

18. A method as claimed in claim 10, wherein analyzing the scanned document further comprises analyzing a pre-defined region of the scanned document for the one or more defined markings.

19. A non-transitory computer readable storage medium on which is embedded a computer program, said computer program implementing a method for scanning a document, said computer program comprising computer readable code to:
   scan a document into a document scanner, said document scanner comprising a display screen for displaying menu-based function options relating to a scanning operation;
   analyze the scanned document to detect one or more defined markings on the scanned document, wherein the one or more defined markings are associated with menus to be displayed on the display screen; and
   in response to detection of the one or more defined markings, control the display screen to display the menu associated with the detected one or more of the defined markings.

20. A non-transitory computer readable storage medium as claimed in claim 19, said computer program comprising computer readable code to:
   distinguish the one or more defined markings from content desired to be scanned on the document.

* * * * *